Sept. 19, 1950 W. G. RANSOM 2,523,057
LOAD RESPONSIVE BRAKE
Filed Aug. 15, 1946 3 Sheets-Sheet 1
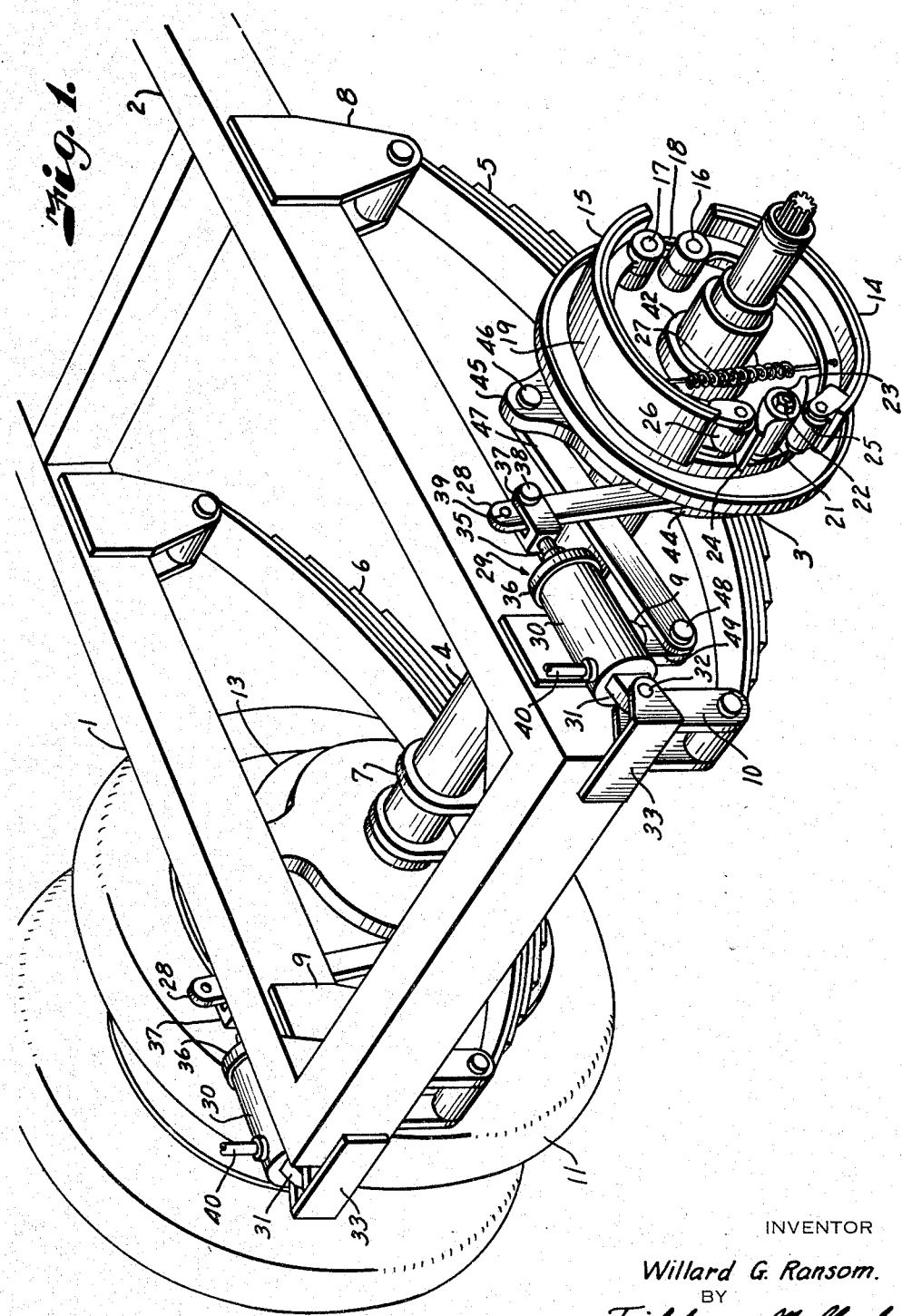
INVENTOR
Willard G. Ransom.
BY
Fishburn + Mullendore
ATTORNEYS

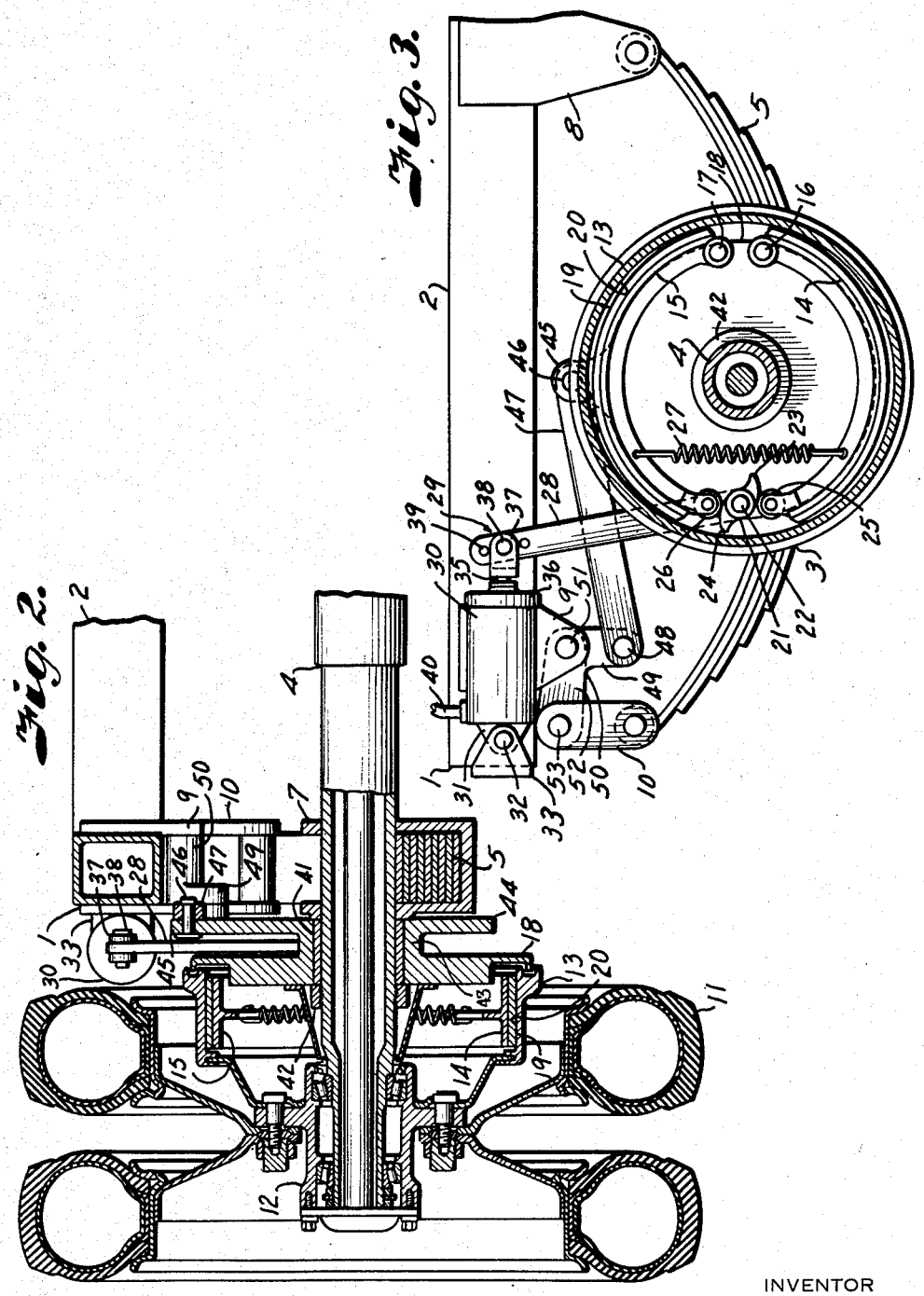

Sept. 19, 1950 W. G. RANSOM 2,523,057
LOAD RESPONSIVE BRAKE
Filed Aug. 15, 1946 3 Sheets-Sheet 3
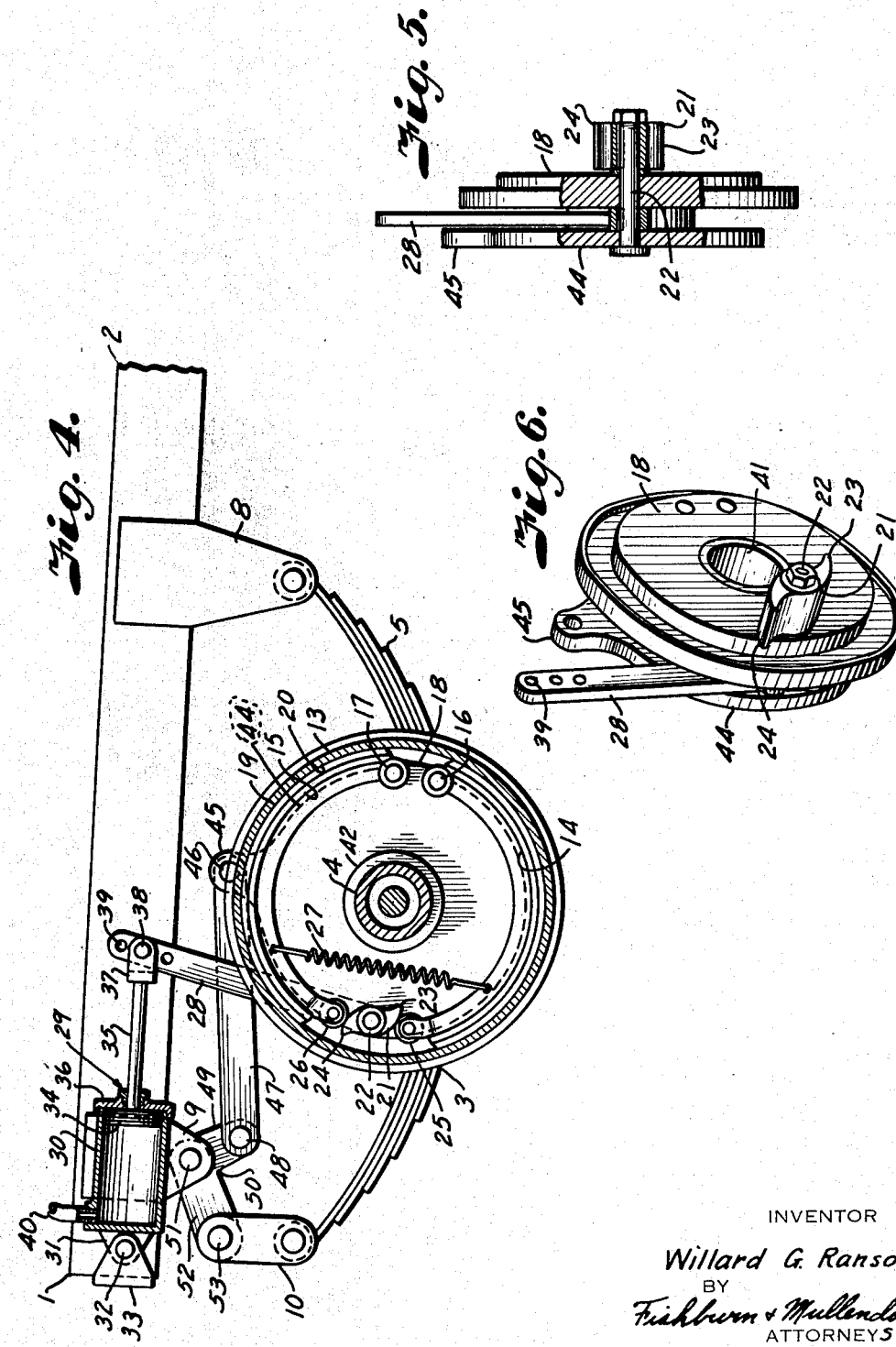
INVENTOR
Willard G. Ransom.
BY
Fishburn & Mullendore
ATTORNEYS Patented Sept. 19, 1950

2,523,057

UNITED STATES PATENT OFFICE 2,523,057

LOAD RESPONSIVE BRAKE

Willard G. Ransom, Homewood, Kans.

Application August 15, 1946, Serial No. 690,693

3 Claims. (Cl. 188—195)

1

This invention relates to brakes for vehicles which carry heavy loads such as motor trucks, trailers and other wheeled conveyances.

Prior to the present invention, it has been the practice to provide such vehicles with brakes wherein the effective leverages combined with an actuating force resulted in a predetermined fixed rate of retardation on the respective wheels independent of the load carried thereon. However, in vehicles of this character the effective retarding forces that can be applied to the respective wheels in emergency applications is proportional to the load carried thereon; consequently, with present braking apparatus, variable loading on the respective wheels or shifting of the load from one wheel to another due to momentum or centrifugal force results in unequal effective retardation of the respective wheels. Thus, when the brakes are applied the less heavily loaded wheels are apt to skid and cause very serious accidents unless the brakes are skillfully applied by an experienced operator. This hazard of skidding is especially aggravated when making an emergency application of the brakes.

The principal object of the present invention is, therefore, to provide a brake apparatus wherewith the braking forces effective on the respective wheels are directly proportional to the load carried or acting thereon.

In accomplishing this and other objects of the invention hereinafter pointed out, I have provided improved structure, the preferred form of which is illustrated in the accompanying drawings wherein:

Fig. 1 is a perspective view of the rear portion of a vehicle chassis, particularly of a truck, equipped with a brake apparatus embodying the features of the present invention.

Fig. 2 is a vertical section through the rear wheels at one side of the chassis.

Fig. 3 is a side elevational view of the vehicle frame, axle mounting spring and brake apparatus, the section being taken through the brake drum, and showing the brakes in released position.

Fig. 4 is a similar view but showing the brakes applied for effecting an emergency stop.

Fig. 5 is a view of the brake shoe actuating levers.

Fig. 6 is a perspective view of the unit shown in Fig. 5.

Referring more in detail to the drawings:

1 designates the rear end of a vehicle chassis such as the chassis of a motor truck having a frame 2 supported at the front and rear ends

2 by wheeled units as in standard truck design. The rear unit 3 is illustrated as comprising an axle housing 4 secured to the frame 2 by elliptical type leaf springs 5 and 6, the axle being secured to the mid portion of the springs by spring seats 7. The front ends of the springs are pivotally connected to brackets 8 carried by the sides of the frame 2 and the rear ends are connected with brackets 9 by shackles 10 and bell crank levers hereinafter described.

Journalled on the respective ends of the axle housing are wheels 11 carried by hubs 12. The hubs 12 carry brake drums 13 cooperating with sets of brake shoes 14 and 15 in applying a retarding force on the wheels when the operator desires to retard speed of the vehicle or bring the vehicle to a stop. The brake shoes are illustrated of arcuate shape and have adjacent ends pivotally mounted as indicated at 16 and 17 on backing plates or disks 18 that are carried on the axle housing and close the open sides of the brake drums 13. The opposite ends of the brake shoes are moved apart to bring the frictional surfaces 19 thereof into contact with the braking surface 20 of the drums 13 by cam levers 21 fixed to shafts 22 journalled in the disks 18 and which have oppositely directed cam portions 23 and 24 engaging rollers 25 and 26 carried by the brake shoes of the respective sets. Turning of the cam levers 21 in a clockwise direction (Fig. 3) moves the shoes 14 and 15 into contact with the drums 13 and the shoes are released upon reverse movement of the cam levers 21 under action of springs 27.

The shafts 22 are actuated by arms 28 that are actuated through individual power mechanisms designated 29 activated from a master control unit (not shown) by the operator of the truck. In the illustrated instance the power units include cylinders 30 substantially horizontally disposed alongside the frame and have ears 31 projecting from their ends which pivotally connect by pins 32 with brackets 33 that extend laterally from the vehicle frame 2 to align the cylinders 29 with the lever arms 28. Slidably mounted in each cylinder 29 is a piston 34 fixed to a rod 35 extending through the heads 36 of the cylinders 30 that face the levers 28 and which have yokes 37 on the free ends. The yokes 37 are connected with the brake arms 28 by pins 38 extending through one of a series of apertures 39 in the ends of the respective brake arms 28. The brake actuating fluid is admitted to the respective cylinders through ducts 40 leading from a control or main reservoir (not shown) that is actuated by the operator of the vehicle.

Heretofore it has been the practice to equip heavy capacity trucks and trailer units with braking power units and leverages sufficient to stop such vehicles under the maximum rated loads which the vehicles are designed to carry, but when the vehicles are empty or carrying lighter loads, unskillful application of the brakes is likely to cause skidding of the wheels and particularly under an emergency application of the brakes for the reason that under light loads the force retarding rotation of the wheels is too great in proportion to the wheel traction on the roadway.

Another difficulty is brought about through shifting of load from the wheels at one side of the vehicle to the wheels at the other side under centrifugal force as when the vehicle is traveling on a curve, or through shifting of load from the rear axle to the front axle under momentum as when making an emergency stop. This momentary shifting in load on the respective wheels often results in skidding of the temporarily less heavily loaded wheels at the time the brakes are applied and may result in a serious accident.

In order to overcome these difficulties, I provide each braking unit with means for controlling and restricting automatically the retarding force in direct proportion to the load carried on the respective wheels so that regardless of different and variable effective loads on the wheels, the ultimate maximum effective retardation for the wheels is kept substantially uniform and at a rate to bring the vehicle quickly and safely under control or to a stop.

In carrying out the invention, the disks or backing plates 18 are mounted on the axle housing 4 so that they will turn with the brake drums to a limited extent but rotation thereof is resisted in accordance with the load carried upon the respective wheels 11. The disks 18 preferably include sleeve-like bearings 41 journalled on the axle between the adjacent spring seats 7 and stop collars 42 that are threaded onto the wheel housing as shown in Fig. 2. Connected with each disk 18 through a hub 43 is a disk 44 having an ear 45 extending upwardly adjacent the truck frame and which is pivotally connected by a pin 46 with a link 47 having its opposite end pivotally connected by a pin 48 with an arm 49 of a bell crank lever 50 previously referred to, the bell crank levers being journalled on pins 51 carried by the brackets 9. The other arm 52 of each bell crank 50 is pivotally connected by a pin 53 with the spring shackles 10.

With the construction thus described, admission of pressure fluid to the respective cylinders 29 effects movement of the pistons 34 and rocking of the brake arms 28 to cause the cam ends 23 and 24 of the levers 21 to move the brake shoes 14 and 15 into contact with the braking surfaces 20 of the brake drums 13 to effect retardation of the wheels 11 as when retarding speed of the vehicle or bringing the vehicle to a stop. Upon contact of the brake shoes 14 and 15 with the drums 13, turning of the wheels 11 tends to rotate the backing plates 18 which carry the brake shoes 14 and 15 but since the backing plates 18 are anchored by the links 47 to the arm 49 of the bell crank levers 50 and the other arms 52 of the bell crank levers are connected to the springs 5 and 6 by the spring shackles 10, rotation of the backing plates 18 is resisted, unless the friction between the brake shoes and the drum is sufficient to effect lift of the load. When this occurs, the relative position of the cam portions 23 and 24 change with respect to the brake shoe rollers 25 and 26 to reduce the pressure of the cams 23 and 24 on the shoes 14 and 15, thereby preventing the retarding forces on the wheels from reaching a value at which skidding is apt to occur.

The above described action is readily understood by inspection of Figs. 3 and 4 of the drawings. For example, assuming that the brakes are to be applied, the operator, through a master unit or control valve, causes a flow of pressure medium through the duct 40 to the cylinder 30 which moves the piston 34 therein toward the right, shifting the brake arm 28 in a clockwise direction. In case of a full emergency application, the piston reaches the end of the cylinder as shown in Fig. 4 to effect a substantially fixed position of the pivotal connection 38 between the piston rod 35 and arm 28. During this movement the cam lever 21 rotates in a clockwise direction from the position shown in Fig. 3 to effect movement of the brake shoes 14 and 15 into contact with the drum 13. If the frictional contact between the brake shoes 14 and 15 and drum 13 is sufficient to rotate the backing plate 18, the connecting link 47 effects rocking movement of the bell crank 50 in an anti-clockwise direction to exert a downward prying action on the spring and an upward lifting action on the frame of the vehicle through the bell crank pivot 51.

During this movement, the brake shoes 14 and 15 advance a corresponding distance in a clockwise direction and the lifting of the frame results in changing the angular position of the brake lever so that the cam portions 23 and 24 of the levers 21 are backed off from the rollers 25 and 26 of the shoes 14 and 15 in an anti-clockwise direction, thereby releasing the frictional contact of the shoes with the drum 13 so that the effective braking or retarding force is limited in proportion to the load lifted; consequently, the retarding force cannot reach the point where skidding is apt to occur.

As the retarding force applied by the brake shoes 14 and 15 reduces, the weight lifted tends to return the backing plate 18 to its original position so that the position of the brake shoes relative to the cam portions 23 and 24 of the lever 21 is under control of the load lifted.

It is obvious that the piston 34 becomes a fixed anchorage or temporary fulcrum when the cylinder pressure is high and the brake-shoe friction force lifts the load and that the downward pressure of the load on the bell-crank 50 is the force which determines the amount of retardation.

From the foregoing it is obvious that I have provided a relatively simple brake system whereby the maximum braking forces that can be applied on the respective wheels are directly under control of an proportional to the load acting on such wheels, consequently, the retardation forces which are applied even on emergency application cannot cause skids when the vehicle is lightly loaded or when the load shifts from one wheel to another as in case of stopping momentum or through the effects of centrifugal force while the truck is traveling on a curved roadway.

What I claim and desire to secure by Letters Patent is:

1. In a vehicle having a wheel for supporting a portion of a load to be carried on the vehicle, a brake drum for said wheel, brake shoes, means for supporting the brake shoes for contact with the drum and for turning movement relatively to the drum responsive to rotational pull of the brake drum on the brake shoes when the shoes are engaged with said drum, cam means carried by the brake shoe supporting means for moving the shoes into contact with the drum, an arm connected with the cam means, a power unit connected with said arm to actuate the cam means, means for lifting the portion of the load carried on said wheel, and means connecting the load lifting means with the brake shoe supporting means for rotating the brake supporting means responsive to the load lifted under rotational pull of the brake drum for modifying the effect of the power unit.

2. In a vehicle including an axle, wheels rotatably mounted at the ends of the axle, a vehicle frame, springs connecting the ends of the axle with the frame, a brake drum on each wheel, brake shoe carriers rotatable on the ends of the axle, brake shoes pivotally supported on the brake shoe carriers, cam levers on the carriers for moving the brake shoes into and out of frictional contact with the brake drums, lever arms connected with the cam levers, power cylinders carried by sides of the frame, pistons slidable in the cylinders, means connecting the pistons with said lever arms, lifting means connecting the springs with the frame for lifting the load acting on the respective wheels, and links connecting said lifting means with the brake shoe carriers for lifting the load acting on the respective wheels responsive to pull on the brake shoe carriers by the drums when the brake shoes are engaged with said brake drums.

3. In a vehicle including an axle, a wheel rotatably mounted at an end of the axle, a vehicle frame, a spring connecting said end of the axle with said frame, a brake drum on said wheel, a brake shoe carrier rotatable on said end of the axle, shoes pivotally supported on the brake shoe carrier and adapted to engage said drum, a cam lever carried by the brake shoe carrier for moving the brake shoes into and out of frictional contact with the brake drum, an arm connected with the cam lever, a power cylinder carried by the frame, a piston slidable in the cylinder, means connecting the piston with said arm, means for lifting the load carried by the frame and acting on said wheel, and a link connecting said lifting means with the brake shoe carrier for lifting the load acting on the wheel to limit rotation of the shoe carrier by pull of the drum when the brake shoes are engaged with said brake drum for modifying the power applied to the brake shoes.

WILLARD G. RANSOM.

REFERENCES CITED

The following references are of record in the file of this patent:

UNITED STATES PATENTS

| Number | Name | Date |
|---|---|---|
| 1,804,697 | Lord | May 12, 1931 |
| 2,250,725 | Ransom | July 29, 1941 |

FOREIGN PATENTS

| Number | Country | Date |
|---|---|---|
| 189,434 | Great Britain | July 12, 1923 |